Sept. 30, 1969   L. B. COURTOT ET AL   3,469,605
LOCK TYPE EXCESS FLOW VALVE
Filed Jan. 27, 1966

INVENTORS
LOUIS B. COURTOT,
& WILLARD C. GIBSON
BY
McNENNY, FARRINGTON, PEARNE & GORDON

ATTORNEYS

3,469,605
LOCK TYPE EXCESS FLOW VALVE

Louis B. Courtot, Euclid, and Willard C. Gibson, Mentor, Ohio, assignors, by mesne assignments, to Textron Inc., Providence, R.I., a corporation of Rhode Island
Filed Jan. 27, 1966, Ser. No. 523,309
Int. Cl. F16k *17/30, 21/02*
U.S. Cl. 137—630                    9 Claims

ABSTRACT OF THE DISCLOSURE

A combination liquid eduction valve and excess flow check valve including a body having a bore therethrough and a valve seat adjacent one end of the bore. A poppet is slidably guided within the bore and is adapted to make sealing engagement with the valve seat. A valve stem extends through the body bore and is slidably carried by a bore through the poppet. A stop member is secured on the outer end of the valve stem and is adapted to make sealing engagement with the poppet to prevent fluid leakage through the poppet bore. A helical spring urges the stop member into sealing engagement with the poppet and the poppet into sealing engagement with the valve seat. Another helical spring carried by the stem urges the poppet against the stop with a constant force independent of the relative position of the body and stem.

---

This invention relates generally to valves and more particularly to a combination liquid eduction valve and excess flow check valve used particularly for liquid filling and eduction in liquefied petroleum gas tanks.

Valves of this type, which are used principally for the eduction or drawing off of the liquefied gases from central storage tanks for recharging and refilling smaller containers are generally located either in the side or bottom of the tank, or if located on the top of the tank are connected by means of a tube to the bottom to allow them to draw off the liquid rather than the gas in the tank above the liquid level. Such valves are sometimes used for filling the tanks and are arranged to be normally closed and to be opened when a suitable fitting is attached to the valve for filling or eduction purposes. In addition, during eduction the valve is arranged to operate as an excess flow valve, so that in the event of a break in the discharge line the sudden increase in flow rate will cause the valve to close to prevent further leakage. Such valves after they have closed because of excess flow allow a slight leakage flow which permits pressure equalization after the rupture has been repaired or turned off so that the valve will then automatically reopen.

Heretofore, such valves have generally used two separate independent valve members located at axially spaced points so that one valve is opened by probe for eduction or filling purposes while the other valve is a spring biased check valve on the inner side of the main valve. Another type of such valve uses a member which is shifted inwardly when the attached coupling is in place to allow a single valve plate to be opened by means of a light spring so that the valve then also serves as an excess flow valve. When the coupling is removed, a heavier spring moves the stem together with a second valve or stop to shift the valve plate to a closed position to positively seal the valve and prevent the escape of liquid.

Heretofore, such valves have had a sliding stem which has required mounting in a spider which is formed or mounted in the valve housing. To make the housing with this spider has resulted in increased cost because if it is made integral with the housing, the machining operations are made much more complex, and if it is made as a separate member, this also increased the cost not only because of the machining cost of the extra member, but also in the assembly of it in the housing.

Furthermore, the presence of the spider has reduced the effective area of the passage and created considerable turbulence which reduces the flow capacity of a valve of any given size so that in some cases it is necessary to use a larger boss or opening to receive a larger and more expensive valve to obtain a sufficiently high rate of flow.

Therefore, it is a principal object of this invention to provide a novel combination eduction and excess flow valve for use with liquefied petroleum gas storage tanks which has a through bored passage extending from end to end through the valve and within which the valve mechanism is mounted.

It is a further object of this invention to provide a valve as set forth in the preceding object in which the movable valve members are guided for alignment directly in the passage bore of the valve for minimum restriction of flow through the valve.

A further object of this invention is to provide a valve as set forth in the preceding objects having a minimum of turbulence and a maximum rate of flow for a given size.

A further object of this invention is to provide a valve as set forth in the preceding object which allows a greater range of movement of the valve member and the use of maximum length springs to minimize the effect of change in spring rate regardless of the extent of opening movement of the valve.

A still further object of this invention is to provide a valve as set forth in the preceding object which may be manufactured and assembled at minimum cost, have maximum durability and safety against excessive pressure conditions, while having a mode of operation compatible with existing equipment.

Further objects and advantages of this invention will readily become apparent to those skilled in the art upon a more complete understanding of the invention, the preferred embodiment of which has been shown in the drawings and described in the following detailed description.

Figure 1:
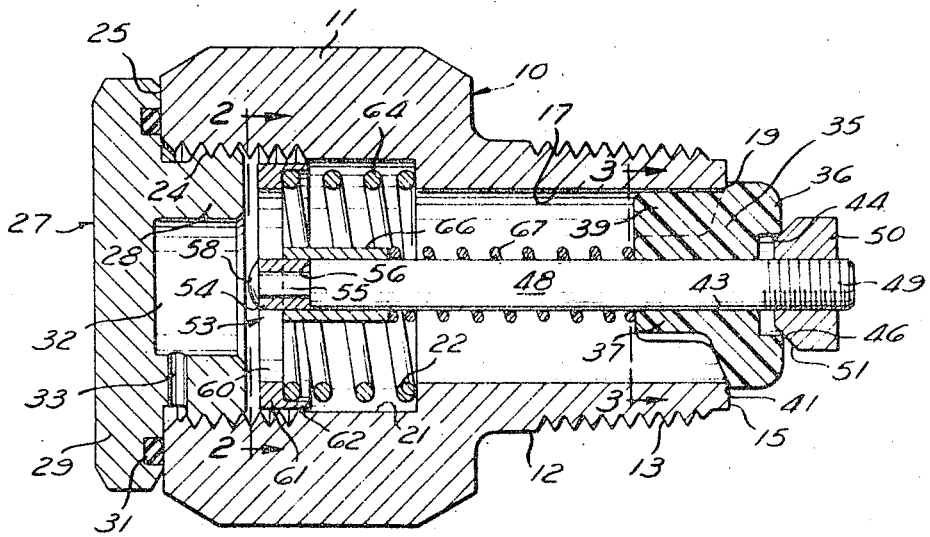
FIGURE 1 is a longitudinal cross-sectional view of a valve according to the preferred embodiment of the invention.
Figure 2:
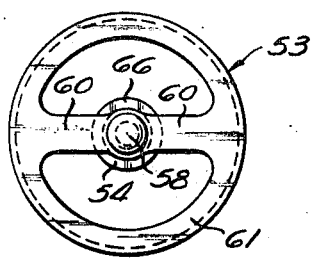
FIGURE 2 is a fragmentary view of the spring guide taken on line 2—2 of FIGURE 1.
Figure 3:
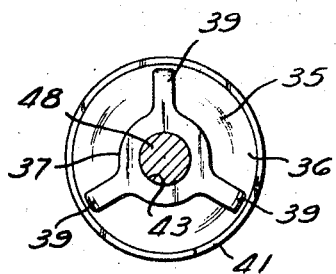
FIGURE 3 is a fragmentary sectional view showing the poppet taken on line 3—3 of FIGURE 1.

Referring to the figures now in greater detail, the valve includes a body 10 of a suitable material such as brass or steel having an enlarged wrench-receiving portion 11 at one end. The other end of the body has a reduced diameter shank 12 having external threads 13 on the end portion. Preferably, the threads 13 are of the tapered pipe thread type for sealing purposes. The shank 12 terminates in a radially planar end face 15 and has an axially extending cylinder bore 17 extending therethrough.

Figure 4:
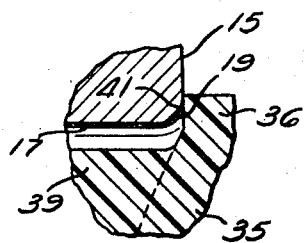
FIGURE 4 is an enlarged fragmentary cross-sectional view showing the sealing engagement of the poppet in the closed position.

The cylinder bore 17 at the end face 15 forms a convexly radiused valve seat portion 19 as shown in greater detail in FIGURE 4.

The other end of the cylindrical bore 17 opens into an enlarged counterbore 21 within the enlarged wrench-receiving portion 11 and a radially extending shoulder 22 is formed at the junction of the bore 17 and counterbore 21. At its outer end, the counterbore 21 is provided with internal threads 24 for receiving either a valve, fitting or sealing plug. The outer end of counterbore 21 terminates in a flat annular end face 25. A plug 27 may be inserted within the counterbore 21 to seal off the valve, and for this purpose plug 27 has a threaded shank 28 adapted to fit in the threaded portion 24 of the counterbore 21. As shown, the plug 27 has an enlarged radially extending head 29 which carries a seal ring 31 adapted to make sealing engagement with the body end face 25. The plug 27 also has a blind bore 32 therein which communicates through a radial passage 33 to the space adjacent the seal 31. This provides for fluid pressure balance within the plug to insure that when the plug is in place the seal takes place at the seal ring 31 so that when the plug is loosened, any fluid pressure which has accumulated within the valve will be released as soon as the seal ring 31 moves away from the end face 25 while the threads still hold the plug in engagement with the valve.

When the valve is closed, the bore 17 is closed off at the inner end at end face 15 and valve seat portion 19 by means of a poppet 35 which has a head portion 36 extending beyond the end of the body 10 and a stem portion 37 fitting within bore 17. The stem 37 has a cylindrical diameter substantially less than that of the bore 17 so as to allow free flow of fluid through the valve when the poppet is open. However, to guide the poppet 35 in the bore 17, the stem 37 has a plurality of vanes 39, shown as being three in number, arranged to have an outer peripheral diameter slightly less than that of the bore 17 to guide and align the poppet 35 in both the open and closed positions. To insure positive sealing, the head 36 has an annular radially extending sealing surface 41 which makes sealing engagement with the valve seat 19 as will be described in greater detail hereinafter. To improve its sealing properties and reduce its reciprocating mass, the poppet is preferably made of a plastic material such as nylon, acetal or polytetrafluoroethylene, but it can also be made of metal if desired.

The poppet 35 has an axially extending bore 43 which opens into a counterbore 44 at the outer end. The edge at the outer end of the counterbore 44 forms a valve seat 46 for purposes of sealing the bore 43 when the valve is in the closed position. An elongated generally cylindrical valve stem 48 is carried with a loose sliding fit in the poppet bore 43 and extends through the valve body to a point adjacent the internal threaded portion 24. At the end adjacent the poppet 35, stem 48 is provided with threads 49 to secure a stop or valve member 50 which is preferably secured in place by staking or upsetting of the threaded stem end so as to prevent removal of the stop member 50 after it has been assembled in place. The stop member 50 carries a conical surface 51 adapted to make sealing contact with the poppet valve seat 46 so as to seal against fluid flow past the stem through the bore 43 when the valve is closed.

At the other end of the stem 48 is mounted a retainer 53 which has a hub 54 adapted to fit on a reduced end 55 of stem 48 against a shoulder 56. The retainer is held in place by means of a spun or upset head 58 formed on the reduced end 55. The retainer 53 has a pair of radial spokes 60 which join the hub 54 with the annular rim 61 which has an axially extending skirt 62 to receive and position one end of a relatively heavy helical spring 64 whose other end abuts against the body shoulder 22. A tubular spacer 66 is fitted around the stem 48 inward of the retainer and serves as one abutment for a light helical spring 67 whose other end abuts against the poppet 35.

In use, the valve is mounted in a pressure tank with the threaded shank portion 13 received in a threaded boss so that the inner end is exposed to fluid under pressure. Under these conditions the valve will assume the configuration, shown in FIGURE 1 in which the spring 64 serves to urge the retainer 53 and hence stem 48 toward the left so that the stop member 50 holds the poppet 35 firmly in sealing engagement with the valve seat 19. Because of the sealing between the sealing surface 41 on poppet 35 against the valve seat 19 and the sealing between the conical stop member surface 51 against the valve seat 46, the valve is effectively sealed against the escape of any fluid pressure from the interior of the vessel. It should be noted that when the shanak 12 is screwed into a threaded boss, to make a proper sealing fit along the threads 13, the shank is threaded so tightly as to tend to cause a reduction in diameter of the portion of the bore 17 underlying the threads in engagement. Accordingly, the vanes 39 on the poppet 35 have an external diameter which before assembly allow a moderate amount of clearance (see FIGURE 4), but when the shank is tightened in position, the reduction in diameter of the bore 17 is such that the vanes 39 slide freely but with a minimum of clearance to guide the poppet 35 and prevent any tilting or cocking.

When the valve is to be opened, the plug 27 is removed and a valve assembly (not shown) is threaded into the counterbore 21 and arranged to make sealing engagement with the valve. When this is done, the shank portion of the valve being inserted engages the retainer 53 to urge the retainer 53 and stem 48 toward the right against the bias of spring 64. It should be noted that the stem 48 remains guided at the one end by the poppet 35 and the vanes 39 and at the other end by the retainer 53 whose rim 61 has a diameter slightly less than that of the counterbore 21. This movement of the stem 48 moves the stop member 50 away from the poppet and the spring 67 now forces the poppet 35 away from the valve seat 19 by holding it in contact with the stop member 50 so as to open the valve. The movement of the retainer, stem and stop member is such that when the poppet 35 is in the open position, the vanes 39 are still within the bore 17 so as to provide positive guidance for the stem 48. When the poppet is open, the bore 17 is relatively unobstructed and allows for a very high rate of flow since there are no obstructions such as spiders or guides for the stem 48 which would cause restrictions and turbulence to flow through the valve.

When the poppet is in the open position, it also acts as an excess flow check valve in the event that a downstream line should be ruptured. In such case, the rate of flow through the valve would increase above the normal eduction rate because of the lack of any back pressure and this increased flow past the poppet 35 would produce a force tending to urge the poppet 35 into engagement with its valve seat 19. In such case, this biasing force on the poppet 35 will overcome the force of spring 67 and the poppet will slide along stem 48 into sealing position against valve seat 19.

When the poppet 35 is in the closed position, it will provide firm sealing contact because only radial surfaces are engaged since the sealing surface 41 makes normal sealing contact with the radial end face 15 and not the radiused seat portion 19, as shown in greater detail in FIGURE 4. Since the poppet is preferably made of a flexible resilient material such as nylon, under high pressure it can flex and still maintain a tight seal. High pressure on the poppet will cause the radial surface 41 to convex outwardly so that the actual sealing contact moves radially inward along the radiused seat portion 19.

Under excess flow check valve action when the poppet 35 is in its closed position and the stop member 50 is held away by the position of the stem 48, a calibrated leakage is provided by means of the clearance between the poppet bore 43 and the stem 48. The fit at this point is made relatively loose to insure that there will be a pressure bleed which is quite small compared to the flow capacity of the valve. This is done because after closure of the downstream line, it is necessary for the poppet 35 to reopen, and this bleed then allows for equalization of pressure on both sides of the poppet 35. Thus, after the downstream line has been closed off the pressure is equalized and the spring 67 forces the poppet 35 again to the open position in engagement with the stop member 50.

When the fitting is removed from the counterbore 21, the spring 64 will move the retainer 53 toward the left so that the stop member 50 shifts the poppet 35 into engagement with the valve seat and the valve is then closed. Because the spring 67 which biases the poppet to the open position abuts on the stem 48 rather than on a member fixed to the body 10, the calibration of the excess flow check valve operation of the poppet 35 is relatively independent of the operation of the spring 64. Likewise, because the poppet stem 37 is generally cylindrical, the effective valve opening is therefore equal to the differential area between that of the bore 17 and the stem 37 so that this opening does not vary substantially with different positions of the opened poppet and this substantially constant area insures that the amount of flow needed to operate the poppet as an excess flow check valve will be substantially constant regardless of small variations in the position of the poppet. Thus, because tolerances of threads and the various valve members are such that when the insert is fully received within the threaded counterbore 21 the amount of movement of the stem 48 will vary, this does not substantially affect the operation of the poppet as an excess flow check valve.

While preferably the poppet is of unitary construction, it is also possible to make the head portion with its sealing function a separate piece from the stem portion which with its vanes performs the guiding function. Such two-piece construction would not affect the operation of the poppet since the pieces would be held together by the baising force of spring 67 and would move together as a unit relative to the body and the valve stem.

Although the preferred embodiment of the invention has been shown and described in detail herein, it is recognized that various modifications and rearrangements will readily become apparent to those skilled in the art upon a full comprehension of this invention and may be resorted to without departing from the scope of the invention as defined in the following claims.

What is claimed is:

1. A valve comprising a body having a bore therethrough, a valve seat adjacent one end of said bore, a poppet slidably guided in said bore and adapted to make sealing engagement with said valve seat, a valve stem located within said bore and slidably carried by said poppet, a stop on said valve stem outward of said poppet, first spring means on said stem operable to bias said poppet against said stop with a constant force independent of the relative position of said body and said stem, and second spring means between said body and said stem operable to bias said valve stem and said stop in a direction to urge said poppet against said valve seat.

2. A valve comprising a body having a bore therethrough, a valve seat at one end of said bore, a poppet having a stem portion slidably guided in said bore and a head portion adapted to make sealing engagement with said valve seat, said poppet having an axial bore therethrough, a valve stem located within said bore and slidable carried by said poppet bore, a stop on said valve stem outward of said poppet, first spring means operable to bias said poppet against said stop with a constant force independent of the relative position of said body and said stem, and second spring means operable to bias said valve stem and said stop in a direction to urge said poppet against said valve seat.

3. A valve as set forth in claim 2 wherein said poppet stem portion has a plurality of radially extending vanes defining fluid passages therebetween and making sliding contact with the walls of said bore to guide said poppet.

4. A valve as set forth in claim 2 wherein said axial bore in said poppet is slightly larger in diameter than said valve stem to allow a leakage passage through said poppet, and said poppet bore forms a valve seat at the end adjacent said stop, said stop having a valving surface adapted to make sealing contact with said poppet valve seat.

5. A valve as set forth in claim 2 wherein said stop is a separate member threadedly secured on said valve stem.

6. A valve as set forth in claim 2 wherein said poppet is a unitary non-metallic member.

7. A valve as set forth in claim 2 including a retainer member secured to the inner end of said valve stem in said bore and in engagement with said second spring means, said retainer having passages therethrough to permit free flow of fluid through said bore.

8. A valve comprising a body having an end face, a bore extending through said body from said end face, a convexly radiused portion formed at the junction of said end face and said bore and with said end face defining a valve seat, an enlarged counterbore in said body coaxial with said bore and opening to the end opposite said end face, the junction of said bore and said counterbore defining a shoulder, a poppet having a stem portion within the end of said bore adjacent said end face, a plurality of radially extending vanes on said poppet stem extending adjacent the walls of said bore to slidably guide said poppet in said bore, said poppet having a head portion adapted to make sealing engagement with said valve seat, an axial bore through said poppet, a valve stem loosely slidably carried in said poppet bore, a stop member secured on the outer end of said valve stem, said stop member having a surface adapted to make sealing engagement with said poppet member to prevent fluid leakage through said poppet bore, said valve stem extending through said bore and into said counterbore, an enlarged retainer member secured to the end of said stem within said counterbore and operable upon insertion of an element into said counterbore to shift said valve stem in a direction to move said stop member away from said end face, a first helical spring carried by said stem and abutting at one end against a member carried by said stem, the other end of said first spring engaging said poppet to bias said poppet against said stop member, and a second helical spring within said counterbore abutting at one end against said shoulder and at the other end against said retainer member to bias said valve stem and said stop in a direction to urge said stop into sealing engagement with said poppet and said poppet into sealing engagement against said valve seat.

9. A combination liquid eduction and excess flow check valve comprising a body having an externally threaded shank portion at one end and an enlarged wrench-receiving portion at the other end, said shank portion having an end face, a bore extending through said body from said end face, a convexly radiused portion formed at the junction of said end face and said bore and with said end face defining a valve seat, said bore extending into said wrench-receiving body portion, an enlarged counterbore in said body coaxial with said bore and having an internally threaded opening open to the end of said body opposite said end face, the junction of said bore and said counterbore defining a shoulder, a poppet having a stem portion within the end of said bore adjacent said end face, a plurality of radially extending vanes on said poppet stem extending adjacent the walls of said bore to slidably guide said poppet in said bore, said poppet having a head portion adapted to make sealing engagement with said valve seat, an axial bore through said poppet, a valve stem loosely slidably carried in said popppet bore, a stop member secured on the outer end of said valve stem, said stop member having a conical surface adapted to make sealing engagement with said poppet member to prevent fluid leakage through said poppet bore, said valve stem extending through said bore and into said counterbore, an enlarged retainer member secured to the end of said stem wtihin said counterbore and operable upon insertion of an element into said internally threaded counterbore to shift said valve stem in a direction to move said stop member away from said end face, a first helical spring carried by said stem and abutting at one end against a member carried by said stem, the other end of said first spring engaging said poppet to bias said poppet against said stop member, and a second helical spring within said counterbore abutting at one end against said shoulder and at the other end against said retainer member to bias said valve stem and said stop in a direction to urge said stop into sealing engagement with said poppet and said poppet into sealing engagement against said valve seat.

References Cited

UNITED STATES PATENTS

| | | | |
|---|---|---|---|
| 3,032,067 | 5/1962 | Johnson | 137—517 XR |
| 3,095,899 | 7/1963 | Billington | 137—517 XR |
| 2,654,383 | 10/1953 | Hopkins | 137—630 XR |
| 2,886,061 | 5/1959 | Smith | 137—517 |
| 2,902,249 | 9/1959 | Meusy | 251—368 XR |

WILLIAM F. O'DEA, Primary Examiner

HOWARD M. COHN, Assistant Examiner

U.S. Cl. X.R.

137—498, 517, 599.2